United States Patent [19]

Simon et al.

[11] Patent Number: 4,788,925
[45] Date of Patent: Dec. 6, 1988

[54] HOLLOW BODY WITH FLEXIBLE ENVELOPE

[76] Inventors: Jochen Simon, Bayernallee 42a, D-1000 Berlin 19; Hans-Joachim Stracke, Fichtestraase 27, D-1000 Berlin 61, both of Fed. Rep. of Germany

[21] Appl. No.: 4,618

[22] Filed: Jan. 20, 1987

[30] Foreign Application Priority Data

Jan. 17, 1986 [DE] Fed. Rep. of Germany ....... 3601691

[51] Int. Cl.⁴ .............................................. B63B 43/10
[52] U.S. Cl. .......................................... 114/69; 441/1
[58] Field of Search ...................... 441/1, 40, 92, 136; 114/68, 69, 345, 270

[56] References Cited

U.S. PATENT DOCUMENTS

| | | | |
|---|---|---|---|
| 3,345,657 | 10/1967 | Peeler et al. | 441/92 |
| 3,653,084 | 4/1972 | Hartman | 441/40 |
| 3,774,566 | 11/1973 | Moore | 114/345 |

Primary Examiner—Sherman D. Basinger
Assistant Examiner—Stephen P. Avila
Attorney, Agent, or Firm—Basile and Hanlon

[57] ABSTRACT

A hollow body which has a flexible envelope and can be pressurized from inside by a pressure medium, the envelope consisting of a foam material, preferably neoprene, with closed cavities whose volume can be altered by changes in the pressure medium to correspondingly alter the thermal insulation capacity of the envelope. A coating may be applied to the foam material on the outside of the hollow body to enhance the stability of its shape when inflated.

4 Claims, 1 Drawing Sheet

U.S. Patent    Dec. 6, 1988    4,788,925
FIG. 1a  FIG. 1b
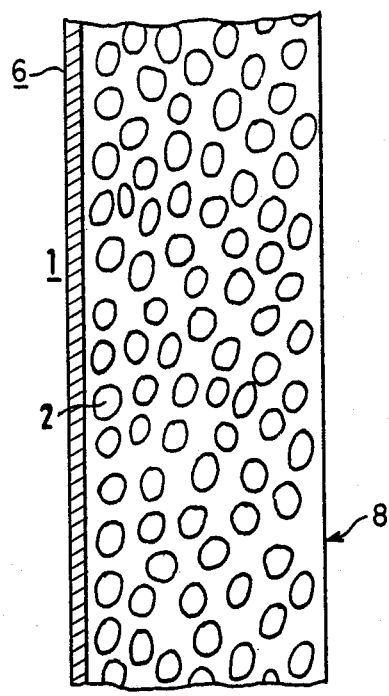
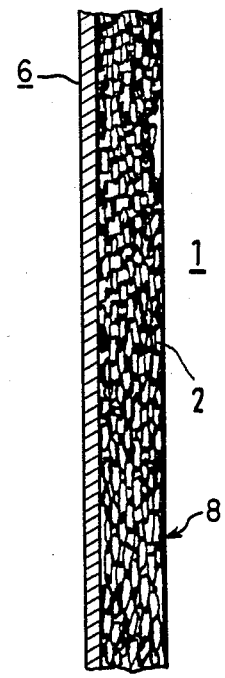
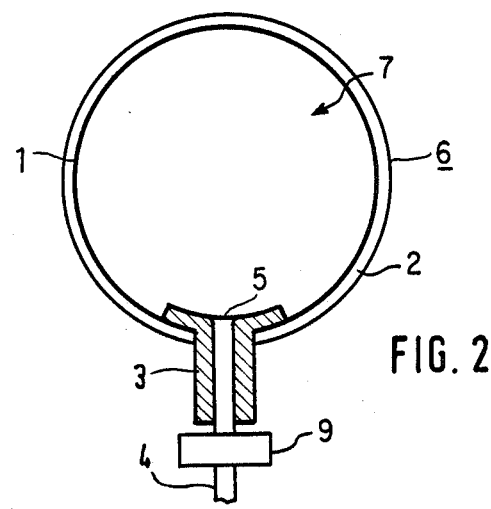
FIG. 2

HOLLOW BODY WITH FLEXIBLE ENVELOPE

BACKGROUND OF THE INVENTION

1. Field of the Invention

The invention relates to a hollow inflatable body which has a flexible envelope and can be pressurized from inside by a pressure medium.

2. Description of the Prior Art

Inflatable hollow members are used in a large number of different applications. They can be employed, amongst other things, for insulation or sealing purposes, or serve as a flexible support for people or articles. As a rule, such hollow bodies consist of a resilient and flexible material which is partially incompressible, such as, for example, rubber, plastics or the like. If such hollow bodies are to be applied in intimate sealing-tight contact with uneven surfaces, a considerable contact pressure is often required if, for reasons of strength, the envelope of the hollow body is not excessively resilient. In such cases, frictional forces make it dificult for the material of the envelope to fit tightly in the regions of dents or similar unevennesses in the matching surface. Such an envelope material also has a relatively high coefficient of thermal conductivity, so that, as a rule, it cannot be used for thermal insulations. Moreover, the coefficient of thermal conductivity cannot be changed in a given hollow body.

SUMMARY OF THE INVENTION

It is, therefore, an object of the invention to provide a hollow inflatable body of the kind specified which has improved surface contacting behavior and whose envelope, moreover, gives satisfactory thermal insulation, the coefficient of thermal conductivity of the envelope material being variable by the use as required.

This object is achieved, according to the invention, by providing the hollow body with an envelope comprised at least partially of a foam material, with closed cavities whose volume can be altered, by the pressure of a pressure medium.

The cavities represent gas, such as, preferably air, inclusions which have a strong thermal insulation effect. The cavities are compressed to a varying extent in dependence on the pressure inside the hollow body so that if pressure rises inside the hollow body, the coefficient of thermal conductivity of the envelope also increases. The compressibility of the envelope material also enables the hollow body to intimately contact a matching surface very satisfactorily, since any unevenesses can also be compensated for by inherent displacements of the material of the envelope.

A preferred substance for the foam material is a chloroprene polymer. The foam material is advantageously coated on the outside of the hollow body with another material by means of which coating the hollow body can be given further required properties. It can, for example, be a material which is particularly compatible with the skin. It can also be substantially non-resilient, so that the shape of the inflated hollow body is practically unchanged and independent of the pressure in its interior. For particular applications, a heat-resistant knitted fabric can be used for the coating. The knitted fabric is attached to the foam material in a manner known in the art.

Preferably the hollow member has a valve to control the admission and discharge of the pressure medium. The valve can be controlled manually or automatically. For example, automatic control measures the temperature at a measuring point. The pressure of the flowable medium in the hollow body is raised or lowered as required in dependence on the measured change in temperature.

BRIEF DESCRIPTION OF THE DRAWINGS

The invention will now be described in greater detail with reference to an embodiment thereof illustrated in the drawings, wherein:

FIG. 1a is a cross-section through a closed pore foam material in the unpressurized condition;

FIG. 1b is a cross-section through the foam material in FIG. 1a in the pressurized condition, and FIG. 2 shows a spherica hollow body in the inflated condition.

DETAILED DESCRIPTION OF THE PREFERRED EMBODIMENT

FIG. 1 is a cross-section through a portion of an envelope 1 of a hollow inflatable body. The envelope 1 preferably consists of a foam material such as neoprene and a chloroprene polymer contains a large number of fine closed cavities 2 which are closed and filled with air. The thickness of the envelope 1 an be varied over a wide range and is selected in accordance with the particular required purpose of use. As a result of the air inclusions, the envelope 1 has outstanding thermal insulating properties.

If pressure is exerted on the envelope 1 from the inside of the hollow body 8, due to the limited resilience of the envelope material and/or the counter pressure of a substantially non-resilient coating 6, applied to the outside of the envelope, the envelope material is compressed in the manner shown in FIG. 1b. The volume of the closed cavities 2 is considerably reduced, and the volume of the enclosed air is also reduced correspondingly. As a result, the thermal insulating capacity of the envelope 1 will be substantially reduced. It can also be readily seen from FIG. 1 that, when the envelope 1 is pressed against a matching surface, it readily will fit intimately thereagainst, and unevennesses in the matching surface can be at least partially compensated for by corresponding internal displacements in the envelope material.

FIG. 2 shows an inflated hollow body whose envelope 1 is spherical. The envelope 1 can, for example, be produced by two flat blanks of foam material being interconnected by annular gluing. The envelope 1 is formed with an aperture 5 to which the end of a tube 4 is attached by means of an attaching spigot 3. A valve 9 can be used to control the admission and discharge of a flowable material, for example, air, into and out of the hollow body via the tube 4. A compressed air source (not shown) is disposed at the other end of the tube 4. The compressed air source itself can also be controlled in a suitable manner.

The inflated hollow body shown has a spherical shape merely by way of example. In accordance with the required use, the envelope of the hollow body is constructed so as to acquire the particular shape selected when in inflated condition.

On example of the use of the hollow body with flexible envelope according to the invention is in divers' suits or lifesaving jackets, in which the invention plays both a sealing and a buoyancy role. Its thermal insulating effect can, at the same time, be controlled over a wide range. However, the hollow body according to the invention can also be used, for example, for insulation purposes in tanks and also in buildings or vehicles.

What is claimed is:

1. A hollow inflatable body comprising an envelope of a flexible resiliently compressible foam material defining the outer wall of an enclosed inflation chamber, a flexible inextensible outer coating in contact with and enclosing said envelope, said foam material having a plurality of closed cavities therein, deformable upon substantial external localized pressure in response to variations in external contacting surfaces, and deformable upon an increase of pressure within the inflation chamber acting to compress the foam material against said flexible inextensible outer coating, whereby the thermal conductivity of said envelope may be varied in response to variations in pressure in said inflation chamber, and means for varying the pressure within the inflation chamber.

2. A hollow inflatable body according to claim 1, wherein the envelope material at least partly comprises a chloroprene polymer.

3. A hollow inflatable body according to claim 1, wherein the flexible inextensible outer coating is a knitted fabric.

4. A hollow inflatable body according to claim 1, further comprising an aperture formed in the envelope, and a valve communicating with said aperture for controlling the admission and discharge of a pressure medium into and out of the hollow body.

* * * * *